United States Patent Office 3,606,817
Patented Sept. 21, 1971

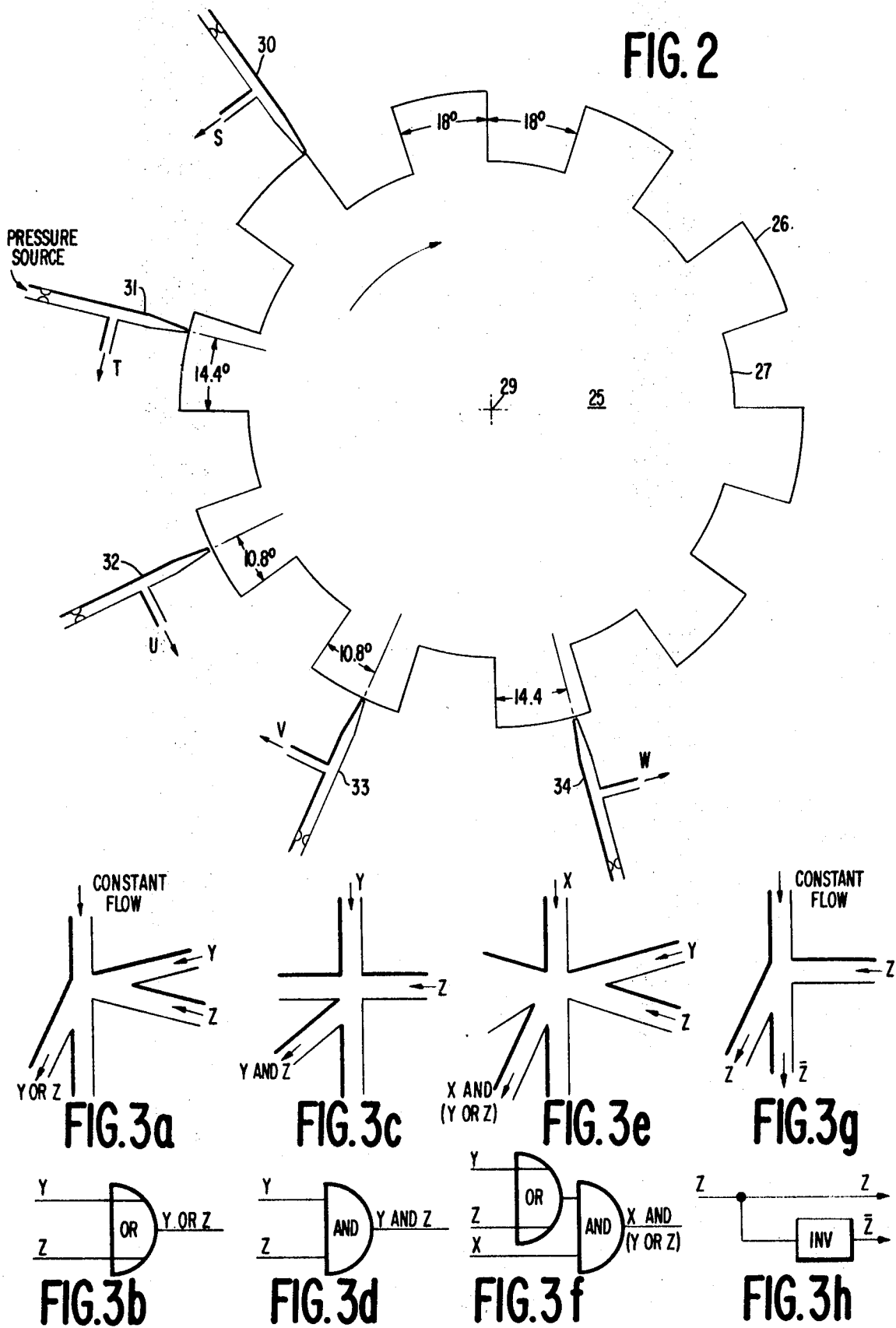

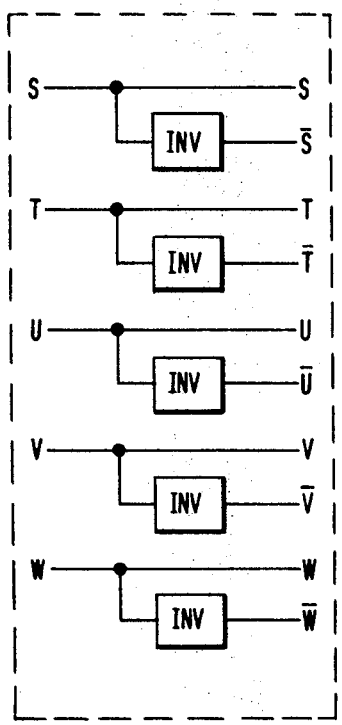
FIG. 4a
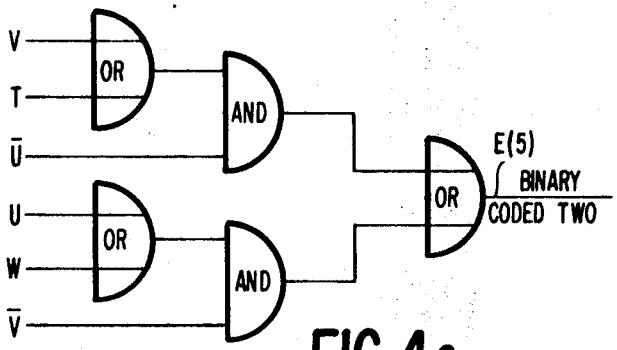
FIG. 4c
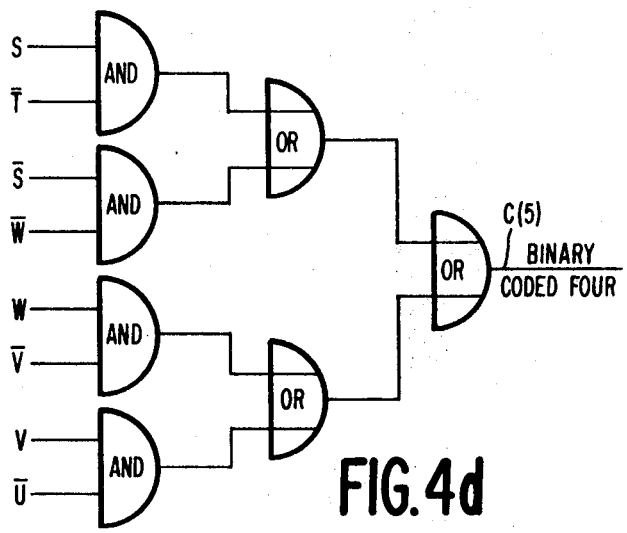
FIG. 4d
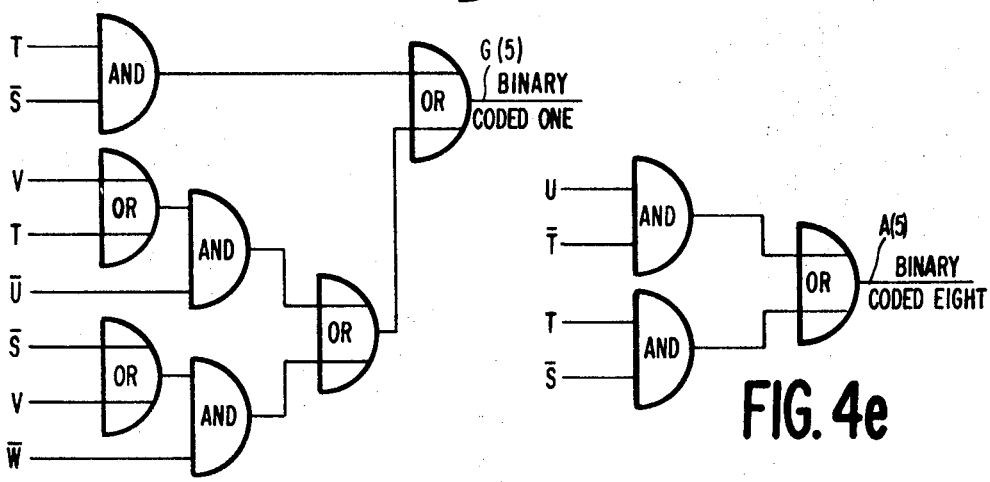
FIG. 4b
FIG. 4e
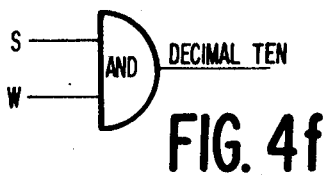
FIG. 4f Sept. 21, 1971  L. W. LANGLEY  3,606,817
FLUIDIC POSITIONING CONTROL SYSTEM
Filed April 29, 1969  5 Sheets-Sheet 4

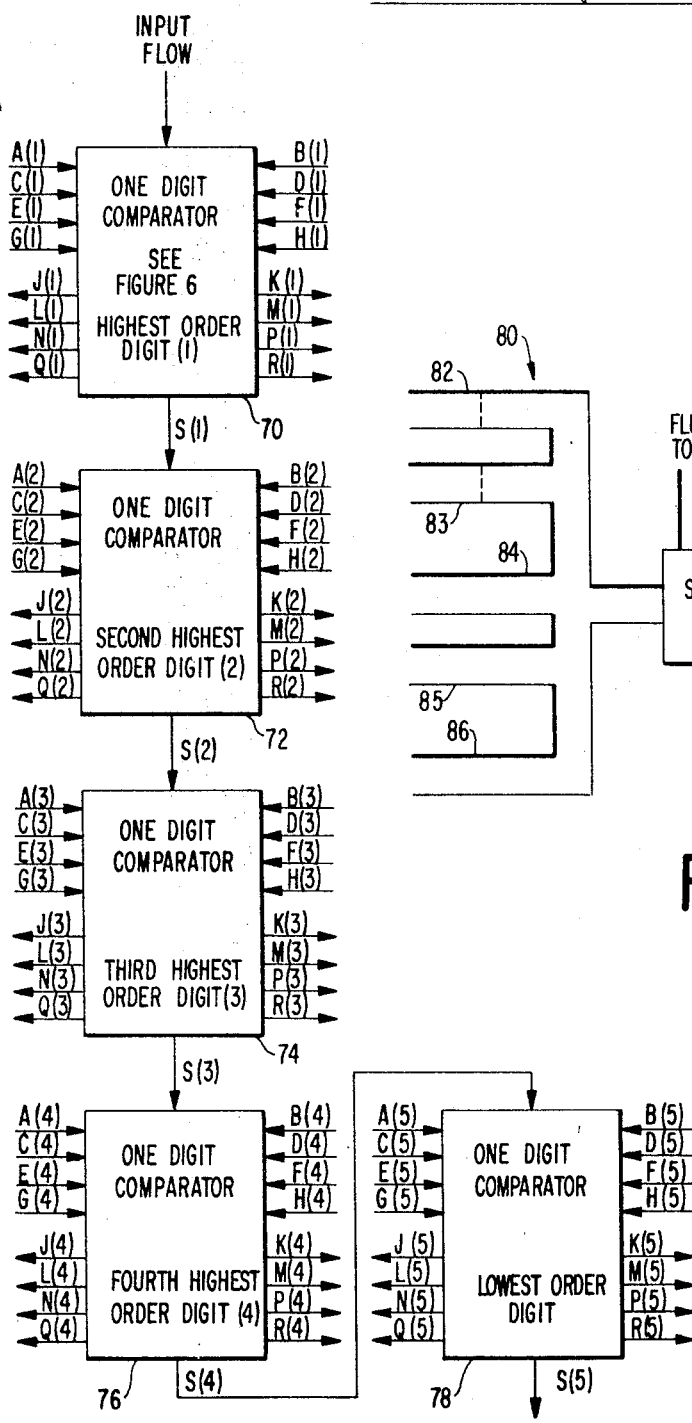
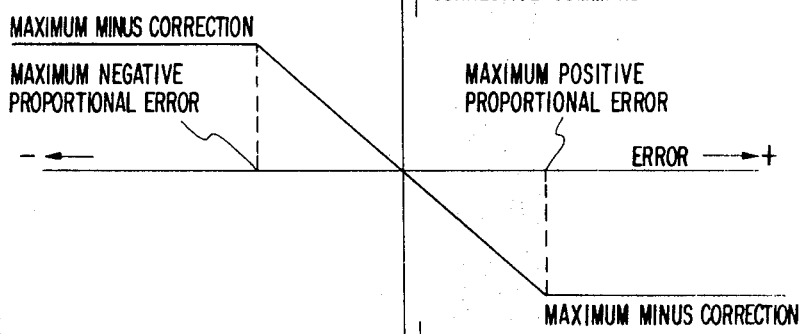
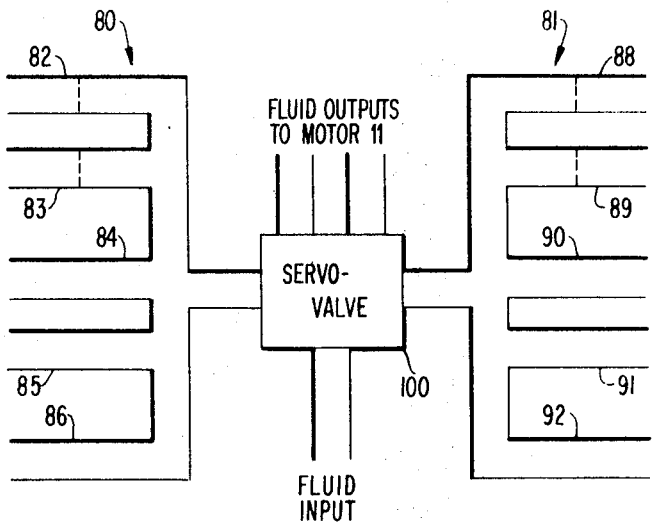
FIG.7
FIG.8
FIG.9

3,606,817
FLUIDIC POSITIONING CONTROL SYSTEM
Lawrence W. Langley, Corning, N.Y., assignor to
Corning Glass Works, Corning, N.Y.
Filed Apr. 29, 1969, Ser. No. 820,166
Int. Cl. F15b 21/02
U.S. Cl. 91—37  4 Claims

ABSTRACT OF THE DISCLOSURE

An all-fluidic positioning control system overcoming frequency limitations by decoding to determine least significant actual position indications, while counting to determine more significant indications. Actual position and desired position are fluidically compared to generate a position correction signal.

BACKGROUND OF THE INVENTION

Field of the invention

This invention relates to a fluidic positioning control system and more particularly to such a system of a type for use with automatic machine tools.

Description of the prior art

Electromechanical positioning control systems for use with automatic machine tools are well known in the prior art. Such systems are sensitive to ambient electromagnetic radiation and electrical line transients, resulting in some inaccuracy.

They also require electrical-to-mechanical conversion at a high power level at the output of the systems. The resulting necessary electro-mechanical equipment has high inertia. Prior systems also require electrical digital position encoding and electrical sensing of paper tape. Prior art systems combine electrical, optical, magnetic and mechanical signals and numerous conversion systems to achieve a complex system of machine tool control.

SUMMARY OF THE INVENTION

The invention can be summarized as an all-fluidic system of positioning control particularly adapted for use with automatic machine tools. The use of all-fluidic control simplifies the system significantly when compared to prior art systems. Fluid force directly drives the output equipment, simplifying the system. All encoding and sensing are done with fluids.

The primary difficulty in the design and construction of an all-fluidic system is the limitation of frequency response. About the maximum response frequency of a fluidic system is 400 c.p.s., which clearly is not very great. In the present invention, this limitation is avoided, while still maintaining adequate precision and speed, by code converting rather than counting to determine the value of the least significant digit.

BRIEF DESCRIPTION OF THE DRAWINGS

FIG. 2 is a schematic diagram of part of the position transducer used in FIG. 1.

FIGS. 3a–3h are schematic diagrams of fluidic logic devices.

FIGS. 4a–4f are schematic diagrams of a system to convert the transducer output to BCD data.

FIG. 7 is a schematic block diagram of a chain of comparators as shown in FIG. 6 for use with the present invention.

FIG. 8 is a graph of a correction curve in the preferred embodiment of the present invention.

FIG. 9 is a schematic block diagram of a summing network and power amplifying valve for use with the present invention.

DESCRIPTION OF THE PREFERRED EMBODIMENT

Figure 1:
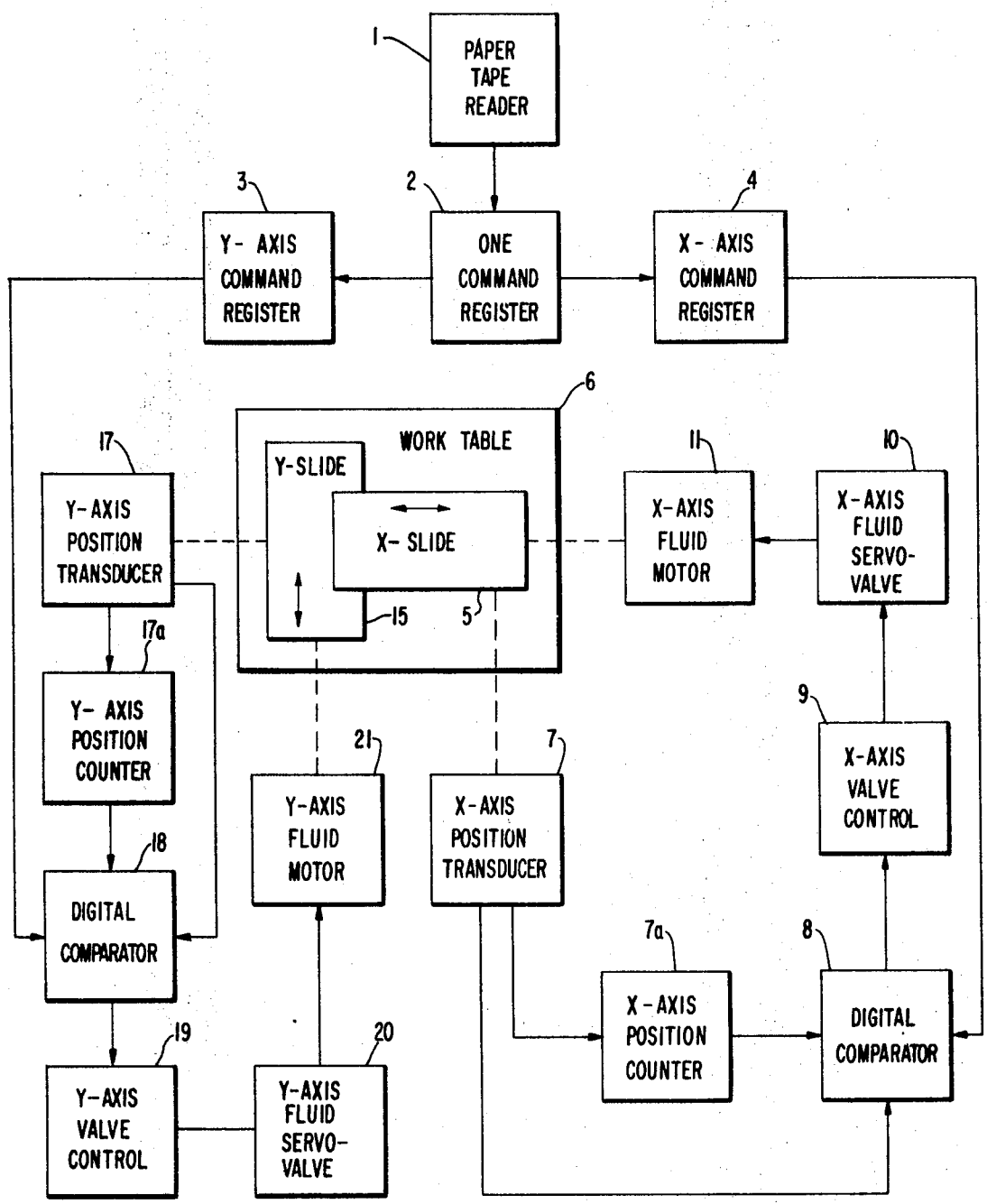
FIG. 1 is an overall block diagram of a fluidic positioning system according to the present invention.

FIG. 1 is an overall block diagram of a system according to the present invention. A fluidic reader 1 of paper tape receives movement commands from a punched paper tape. The transport system of the reader may be operated fluidically with a device as disclosed in U.S. Pat. application 668,068, filed on Sept. 15, 1967, by Lynn G. Amos and Lawrence W. Langley. The data transfer system of the reader operates in a well-known manner by directing fluid under pressure against the tape to locate and sense openings in the tape.

The input data from the reader is applied to a one command buffer 2, which may be constructed in any well-known manner. For example, the components disclosed in U.S. Pat. 3,001,698 (Warren) can be used to construct a suitable buffer. The data from buffer 2 is split into two parts, one part controlling movement along the Y axis and one controlling movement along the X axis. The Y-axis data is applied to a Y-axis command register 3, and the X-axis data is applied to an X-axis command register 4.

The data in the X-axis command register is intended to control an X-slide 5 on a work table 6. Such slides and work tables are well-known in the machine tool control art. The position of the X-slide is measured by an X-axis position transducer 7 in conjunction with X-axis position counter 7a to give an actual position indication. The construction of transducer 7 is more fully explained in connection with FIG. 2, while the construction of position counter 7a is more fully explained in connection with FIG. 5.

A desired position signal from register 4 and an actual position signal from transducer 7 and counter 7a are compared by a digital comparator 8 to generate an error signal output.

The actual position signal presented to comparator 8 comprises a hybrid signal composed of two parts. The first part represents the least significant digit and is derived directly from transducer 7. The second part corresponds to the most significant digits and is accumulated in counter 7a. Thus, high speed operation is attained since the least significant digit is immediately available from transducer 7 while the desired positional accuracy is assured by employing the required number of stages in counter 7a. The construction of the comparator is more fully explained in connection with FIG. 6.

The error signal from comparator 8 is applied through an X-axis valve control 9 and an X-axis fluid servo-valve 10 to control an X-axis fluid motor 11, which drives the X-slide 5. Thus, elements 4, 8, 9, 10, and 11 are elements in the forward path of the control system, and transducer 7 and counter 7a are in the feedback path.

In the Y channel, Y-slide 15, Y-axis transducer 17, Y-axis position counter 17a, digital comparator 18, Y-axis valve control 19, Y-axis fluid servo-valve 20, and Y-axis fluid motor 21 correspond respectively to elements 5 and 7–11 in the X channel.

FIG. 2 is a diagram of a position transducer 25 for use in the system of FIG. 1. A disc is prepared with notches around its edges. Ten plateaus 26 and ten notches 27, each 18° wide, are alternated around the disc. (In a broader sense, any number of $n$ notches and $n$ plateaus could be used, each being $360°/2n$ wide.) The disc is affixed at its center point 29 to a shaft (not illustrated) which is geared to rotate one full turn each time the associated slide 5 or 15 moves, in the preferred embodiment, by 0.1 inch (0.254 cm.).

Directed at the edge of the disc are 5 fluidic probes 30–34, each receiving an input flow from a pressure source and providing respective probe output signals S, T, U, V and W. A probe output signal is characterized by a greater flow of fluid when the nozzle tip of the probe is adjacent to a plateau of the disc and by a lesser flow of fluid when the probe tip is adjacent to a notch. Restrictions in the feed paths of the probes prevent a signal when the nozzle is free-flowing due to the presence of a notch at the tip. When probe 30 is situated directly over the leading edge of a plateau, probe 31 is 3.6° back over the plateau from the leading edge, probe 32 is 7.2° back, probe 33 is 10.8° back and probe 34 is 14.4° back. Thus, the probes are arranged in a vernier pattern.

When the output signals from any two of the probes are combined in a binary manner, it is possible to obtain ten distinct vernier signals which occur cyclically each time the wheel rotates 36°.

| Decimal value: | Probe signal combination |
|---|---|
| 1 | $V\overline{W}$ |
| 2 | $U\overline{V}$ |
| 3 | $T\overline{U}$ |
| 4 | $S\overline{T}$ |
| 5 | $\overline{S}\,\overline{W}$ |
| 6 | $\overline{V}W$ |
| 7 | $\overline{U}V$ |
| 8 | $\overline{T}U$ |
| 9 | $\overline{S}T$ |
| 10 | $SW$ |

In the preferred embodiment of this invention, the output data from the transducer is used in binary coded decimal (BCD) form. Therefore, the probe signal combinations in the previous table are of interest only as an intermediate value used to derive the BCD values. The logic equations for the BCD conversion are as follows:

$$\text{BINARY CODED ONE} = V\overline{W} + T\overline{U} + \overline{S}\,\overline{W} + V\overline{U} + T\overline{S}$$
$$= \overline{W}(V+\overline{S}) + \overline{U}(T+V) + T\overline{S}$$

$$\text{BINARY CODED TWO} = U\overline{V} + T\overline{U} + W\overline{V} + V\overline{U}$$
$$= \overline{U}(T+V) + \overline{V}(U+W)$$

$$\text{BINARY CODED FOUR} = S\overline{T} + \overline{S}\,\overline{W} + W\overline{V} + V\overline{U}$$

$$\text{BINARY CODED EIGHT} = U\overline{T} + T\overline{S}$$

There is also a decimal 10 which can be combined with a directional signal to count other decades up or down, derived by the following logic equation:

$$\text{DECIMAL TEN} = SW$$

FIGS. 3a through 3h are diagrams of known fluidic logic elements and conventional logic diagram representations of the same elements. FIGS. 3a and 3b represent a fluidic OR circuit, FIGS. 3c and 3d represent an AND circuit, FIGS. 3e and 3f represent a combination OR and AND circuit, and FIGS. 3g and 3h represent an inverter.

FIGS. 4a through 4f represent the preferred embodiment of a fluidic system for converting from probe output signals to BCD output signals. FIG. 4a is a block diagram of an inverter arrangement for providing inverted probe signals. The outputs of the FIG. 4a system are the inputs for the systems of FIGS. 4b through 4f. These figures represent, in a clear fashion, systems for mechanization of the five preceding equations.

Figure 5:
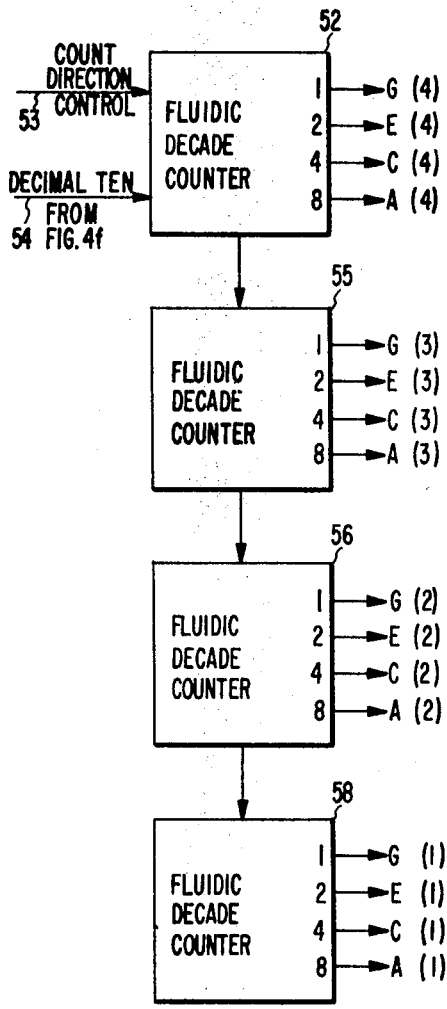
FIG. 5 is a schematic block diagram of a counting system used with the present invention.

FIG. 5 is a block diagram of a fluidic counting arrangement for counting fluidic pulses from the transducer of FIG. 2.

For example, the DECIMAL TEN signal from FIG. 4f is applied by means of line 54 to the input of a first fluidic decade counter 52, which may be constructed using similar components to those used in buffer 2. The counter may be a typical 1 2 4 8 BCD arrangement in which the 8 place is modified to form a decade counter. A count direction control signal is applied on line 53 to control the direction of the reversible count. The count direction control signal is derived by sensing the direction of rotation of the transducer disc. The DECIMAL TEN signal is applied as an ADD or SUBTRACT signal, depending upon the direction of the count direction control signal. Outputs A(4), C(4), E(4) and G(4) are supplied from the stages of the counter.

Other similar counting stages 55, 56, and 58 are connected in series with the counter 52 output to register higher order values of the count.

Figure 6:
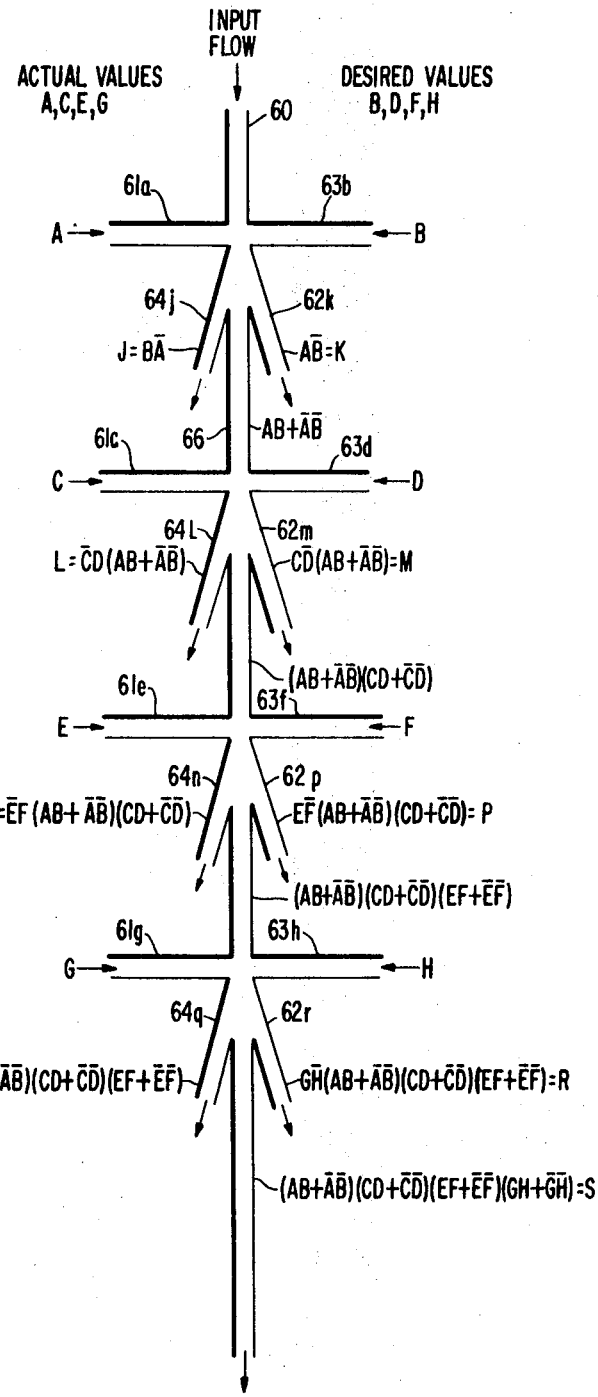
FIG. 6 is a schematic diagram of a comparator for use with the present invention.

FIG. 6 is an illustration of one section of a digital comparator for use in block 8 of FIG. 1. A constant input flow is provided at input 60.

Actual value indications from one decade counter stage of FIG. 5 enter the ports 61a, 61c, 61e, and 61g of the comparator to provide signals A, C, E, and G, respectively. Desired value indications from one decade of command register 4 enter the ports 63b, 63d, 63f and 63h of the comparator to provide signals B, D, F and H, respectively. The most significant signals are located closest to the input terminal 60.

In operation, if A is ON and B is OFF, flow will be diverted to output port 62k, giving an $A\overline{B}$ signal or $A > B$. If A is OFF and B is ON, a $B\overline{A}$ or $B > A$ signal results at port 64j. If A and B are both OFF or both ON, the signal is not diverted and a flow through channel 66 results, indicating $AB + \overline{A}\,\overline{B}$. A flow through channel 66 indicates that A and B are equal and the next most significant signals are considered.

Flow in any one of output channels 64j, 64l, 64n, and 64q, giving signals J, L, N or Q, respectively, indicates that the actual value is less than the desired value, while flow in any one of output channels 62k, 62m, 62p, and 62r, giving signals K, M, P or R, respectively, indicates that the actual value is greater than the desired value.

FIG. 7 is a block diagram of a chain of comparators of the type shown in FIG. 6. This chain derives the comparison for the entire actual and desired value. More comparators can be used in the chain for larger table movements. The input and output signals from the various individual comparators in the chain are labelled with the same letters as are the corresponding signals in the device of FIG. 6. Numbers have been added to distinguish the stage in which a signal is used or derived.

The first comparator 70 in the chain operates on the highest order or most significant digit, with the remaining comparators 72, 74, 76, and 78 operating on successively less significant digits. A signal S(5) from comparator 78 indicates total equality of the signals.

FIG. 8 is a graph of the desired form of error correction in the preferred embodiment. If the error is within certain limits, it is desirable that the error be corrected by a proportional corrective command so that the system will approach a final value with accuracy and without excessive hunting. But if the error is outside those limits, it is desirable to have the system apply maximum corrective power, to reduce the time required for correction.

Accordingly, as shown in FIG. 9, the comparison outputs indicating the grosser errors, for example those from comparators 70, 72, and 74 of FIG. 7, will be applied, depending on their indicated error direction, to a summing network 80 or 81 through a channel which allows free flow of fluid. But the comparison outputs indicating finer errors, for example those from comparators 76 and 78 of FIG. 7, will be applied, again depending on their indicated error direction, to either network 80 or 81 through a channel containing a weighted impedance in the form of an orifice. The weighting is arranged to de-emphasize less significant errors.

Network 80 contains a plurality of channels, including channels 82 and 83 with weighted orifices and channels 84, 85 and 86 without orifices. Network 81 contains channels 88 and 89 with orifices and channels 89, 91 and 92 without orifices. Such weighted impedance networks in an electrical form are well known in the electrical digital-to-analog converter arts.

The outputs from the summing networks 80 and 81 are applied to both sides of a conventional servo-valve 100, which is a sensitive fluid power amplifier. The Moog Company, for example, is a supplier of a suitable valve of this type.

The summing networks 80 and 81 are part of the control block 9 and the Moog valve 100 is a form of servo-valve 10, both as shown in FIG. 1. The output power from the Moog valve drives the fluid motor to position the work table.

While the details of this invention have been explained in connection with the elements of the X-axis channel, the explanation is equally applicable to the Y-axis channel.

While the invention has been particularly shown and described with reference to a preferred embodiment thereof, it will be understood by those skilled in the art that various changes in form and details may be made therein without departing from the spirit and scope of the invention.

What is claimed is:

1. A fluidic system for controlling the actual position of an object in response to fluidic desired-position commands comprising:
   (a) a fluidic register means for storing a fluidic binary-coded indication of said desired position,
   (b) a fluidic transducer means for measuring said actual position of said object and for providing a fluidic binary-coded indication of said actual position,
   (c) a fluidic comparator means for comparing the fluidic binary-coded indications of said actual position and said desired position to derive a fluidic indication of the error between said actual position and said desired position, and
   (d) a fluidic means for altering said actual position responsive to said fluidic indication of said error.

2. A system according to claim 1 wherein said transducer means further comprises:
   (a) a disc having a plurality of plateaus and notches, each equally wide, arranged about its periphery, and
   (b) a plurality of fluidic probes adjacent to said discs to provide indications of a first type when situated over plateaus and indications of a second type when situated over notches, said probes being arranged in a vernier pattern over said plateaus and notches, whereby said probes provide a vernier selection of different output signals to more finely divide the periphery of said disc.

3. A system according to claim 2 wherein said transducer means further comprises:
   (a) means to code convert the output signals from said probes to provide a fine indication of actual position, and
   (b) means ot count output signals from at least one probe to provide a coarser indication of actual position,
   whereby the frequency response capabilties of said system are improved.

4. A system according to claim 1 wherein said comparator means further comprises:
   (a) a fluid channel comprising an input end, an output end, intermediate control channels connected to said fluid channel on a first side and on a second side, and intermediate output channels from said fluid channel respectively associated with said intermediate control channels and located on said first side and said second side,
   (b) means for providing a flow of fluid into said input end,
   (c) means for applying said fluidic binary coded indication of said actual position to said intermediate control channels on said first side, with the most significant parts of said binary coded indication of said actual position being applied to the ones of said control channels nearest to said input end,
   (d) means for applying said fluidic binary coded indication of said desired position to said intermediate control channels on said second side, with the parts of said binary coded indication of said desired position being applied to control channels on said second side corresponding to the respective control channels on said first side to which respective parts of said binary coded indication of actual position are applied,
   whereby said flow of fluid is diverted to an intermediate output channel on said first side when said binary coded indication of said desired position is greater than said binary coded indication of said actual position, and said flow of fluid is diverted to an intermediate output channel on said second side when said binary coded indication of said actual position is greater than said binary coded indication of said desired position, and said flow of fluid reaches said output end when the two indications are equal.

References Cited
UNITED STATES PATENTS

| | | | |
|---|---|---|---|
| 2,995,899 | 8/1961 | Magor | 91—37 |
| 3,012,545 | 12/1961 | Goldmann | 91—36 |
| 3,122,039 | 2/1964 | Sowers | 91—37UX |
| 3,198,084 | 8/1965 | Hague et al. | 91—37 |

EVERETTE A. POWELL, JR., Primary Examiner